(12) United States Patent
Jeon (10) Patent No.: US 11,897,549 B2
(45) Date of Patent: Feb. 13, 2024

(54) STEER-BY-WIRE TYPE STEERING APPARATUS

(71) Applicant: HL MANDO CORPORATION, Gyeonggi-do (KR)

(72) Inventor: In Hwan Jeon, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 147 days.

(21) Appl. No.: 17/618,459

(22) PCT Filed: Jun. 10, 2020

(86) PCT No.: PCT/KR2020/007518
§ 371 (c)(1),
(2) Date: Dec. 11, 2021

(87) PCT Pub. No.: WO2020/256336
PCT Pub. Date: Dec. 24, 2020

(65) Prior Publication Data
US 2022/0348250 A1    Nov. 3, 2022

(30) Foreign Application Priority Data

Jun. 20, 2019   (KR) .......................... 10-2019-0073264

(51) Int. Cl.
*B62D 5/00* (2006.01)
*B62D 5/04* (2006.01)
*B62D 15/02* (2006.01)

(52) U.S. Cl.
CPC .......... *B62D 5/001* (2013.01); *B62D 5/0424* (2013.01); *B62D 5/0457* (2013.01); *B62D 15/0225* (2013.01); *B62D 5/0448* (2013.01)

(58) Field of Classification Search
CPC ................................................. B62D 15/0225
See application file for complete search history.

(56) References Cited

U.S. PATENT DOCUMENTS

| 9,227,653 B2 * | 1/2016 | Kita ....................... B62D 3/126 |
| 10,308,282 B2 * | 6/2019 | Katzourakis ........... B62D 6/006 |
| 11,046,360 B2 * | 6/2021 | Jin ........................ B62D 5/0463 |

(Continued)

FOREIGN PATENT DOCUMENTS

| CN | 104108418 A * | 10/2014 | ......... B62D 15/0235 |
| DE | 102012012386 A1 * | 12/2013 | ............... B62D 6/10 |

(Continued)

OTHER PUBLICATIONS

International Search Report for PCT/KR2020/007518 dated Sep. 11, 2020 (now published as WO 2020/256336) with English translation provided by WIPO.

(Continued)

*Primary Examiner* — Kevin Hurley
(74) *Attorney, Agent, or Firm* — Ladas & Parry, LLP (57) ABSTRACT

The present embodiments may provide a steer-by-wire type steering apparatus which can significantly reduce production cost by reducing the number of components and simplifying the assembly procedure, by eliminating a pinion gear, etc., and sensing the position of a sliding bar on the basis of rotation information detected from a gear box which transfers the rotational force of a motor to the sliding bar.

15 Claims, 12 Drawing Sheets

(56) References Cited

U.S. PATENT DOCUMENTS

| | | | |
|---|---|---|---|
| 11,465,682 B2 * | 10/2022 | Walentowski | ......... B62D 1/184 |
| 2016/0280253 A1 | 9/2016 | Ueno et al. | |
| 2017/0267277 A1 | 9/2017 | Ohashi | |
| 2020/0391784 A1 | 12/2020 | Saito et al. | |
| 2022/0348252 A1 * | 11/2022 | Min | ..................... B62D 5/0481 |

FOREIGN PATENT DOCUMENTS

| | | | | |
|---|---|---|---|---|
| DE | 102019201101 A1 * | 7/2020 | | |
| DE | 11 2018 007 518 | 1/2021 | | |
| DE | 11 2019 005 763 | 8/2021 | | |
| DE | 102011015696 B4 * | 6/2022 | ........... B62D 5/0457 | |
| DE | 102021203923 A1 * | 10/2022 | | |
| DE | 102021212470 A1 * | 5/2023 | | |
| JP | 2012-211857 | 11/2012 | | |
| KR | 10-2005-0116990 | 12/2005 | | |
| KR | 10-0757646 | 9/2007 | | |
| KR | 10-2013-0048837 | 5/2013 | | |
| KR | 10-1398091 | 5/2014 | | |
| KR | 20230072716 A * | 5/2023 | | |
| WO | 2020/101445 | 5/2020 | | |

OTHER PUBLICATIONS

Written Opinion of the International Searching Authority for PCT/KR2020/007518 dated Sep. 11, 2020 (now published as WO 2020/256336) with English translation provided by Google Translate.

Office Action dated Mar. 22, 2023 for German Patent Application No. 11 2020 002 949.2 and its English translation by Google Translate.

International Preliminary Report on Patentability (Chapter I) for PCT/KR2020/007518 dated Dec. 21, 2021 and its English translation from WIPO (now published as WO 2020/256336).

* cited by examiner

STEER-BY-WIRE TYPE STEERING APPARATUS

TECHNICAL FIELD

Embodiments of the present disclosure relate to a steer-by-wire steering apparatus and, more particularly, to a steer-by-wire steering apparatus able to detect the position of a slide bar using a simpler structure so as to reduce the number of parts and simplifying an assembly process, thereby significantly reducing costs.

BACKGROUND ART

A steer-by-wire steering apparatus is a type of electric steering apparatus, and steers a vehicle using electric power without a mechanical connection, such as a steering column or a universal joint, between a steering wheel and a front wheel steering apparatus.

That is, a driver's steering wheel operation is converted into an electrical signal. When the electrical signal is input into an electronic control device, the output of a motor is determined. Such an SBW system with no mechanical connection may reduce injury to a driver caused by a mechanical part in a collision accident. Since the mechanical connection and hydraulic parts may be removed, the weight of a vehicle may be reduced due to the reduced number of parts, and simplification such as significantly reduced line assembly work may be realized. In addition, unnecessary energy consumption during a steering operation may be reduced, thereby improving fuel efficiency. In addition, ideal steering performance may be realized by electronic control unit (ECU) programming.

Like a typical steering apparatus, a steer-by-wire steering apparatus also includes a sensor to detect the position of rack bar. A steer-by-wire steering apparatus of the related art has included a pinion gear used in a typical steering apparatus to determine the position of a rack bar by sensing the angle of rotation of a pinion gear rotating in response to the rotation of the rack bar.

However, the provision of the pinion gear to determine the position of the rack bar, not only the pinion gear but also a support yoke and the like are required. Thus, the number of required parts is increased and an assembly process is complicated, thereby causing the problem of inefficiency.

DISCLOSURE

Technical Problem

Accordingly, embodiments of the present disclosure have been made in consideration of the above-described problems occurring in the related art and may provide a steer-by-wire steering apparatus from which a pinion gear or the like is removed, the steering apparatus being able to detect the position of a slide bar based on rotation information detected from a gear box transferring rotational force from a motor to the slide bar so as to reduce the number of parts and simplifying an assembly process, thereby significantly reducing costs.

Technical Solution

According to embodiments the present disclosure, provided is a steer-by-wire steering apparatus including a slide bar sliding in an axial direction to steer wheels, a motor connected to the slide bar through a gear box 113 slide the slide bar, and a sensor detecting rotation information from the gear box and detecting a movement position of the slide bar based on the rotation information.

Advantageous Effects

According to embodiments of the present disclosure, the steer-by-wire steering apparatus, from which the pinion gear or the like is removed, can detect the position of the slide bar based on rotation information detected from the gear box transferring rotational force from the motor to the slide bar so as to reduce the number of parts and simplifying the assembly process, thereby significantly reducing costs.

BEST MODE

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
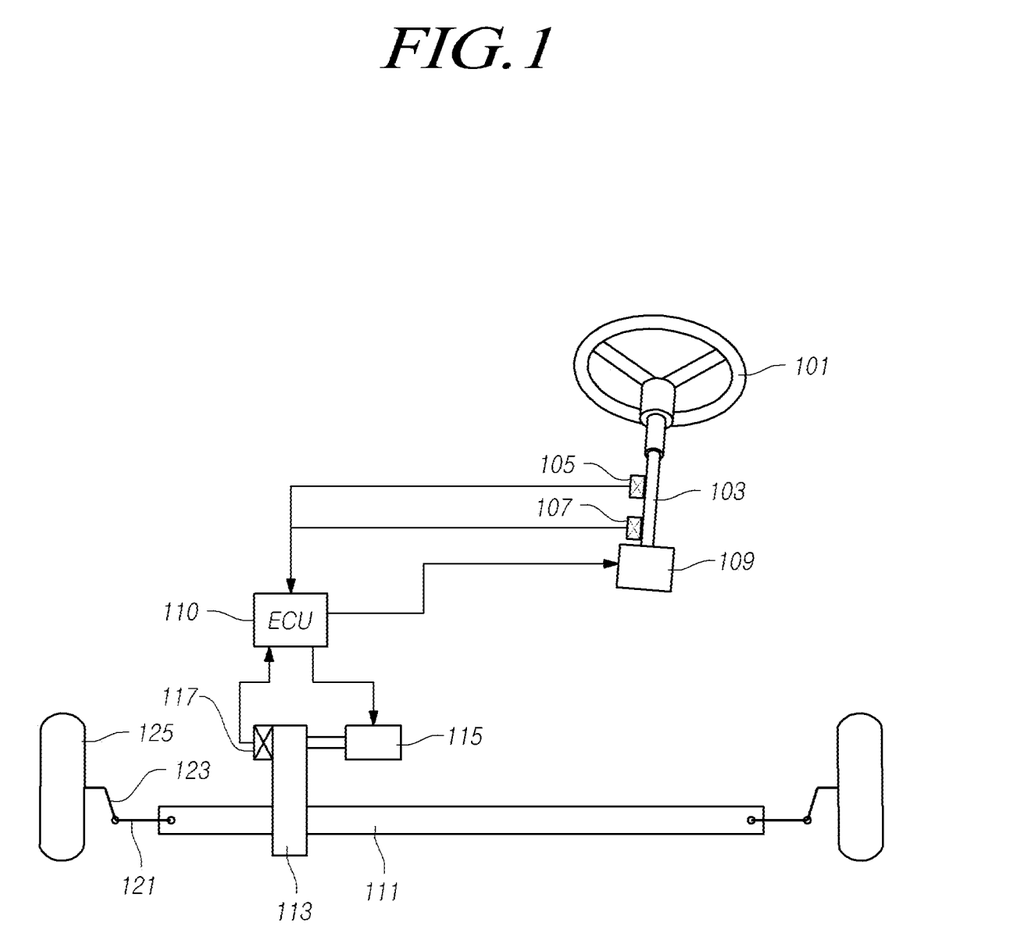
FIG. 1 is a schematic view of a steer-by-wire steering apparatus according to embodiments of the present disclosure.
Figure 2:
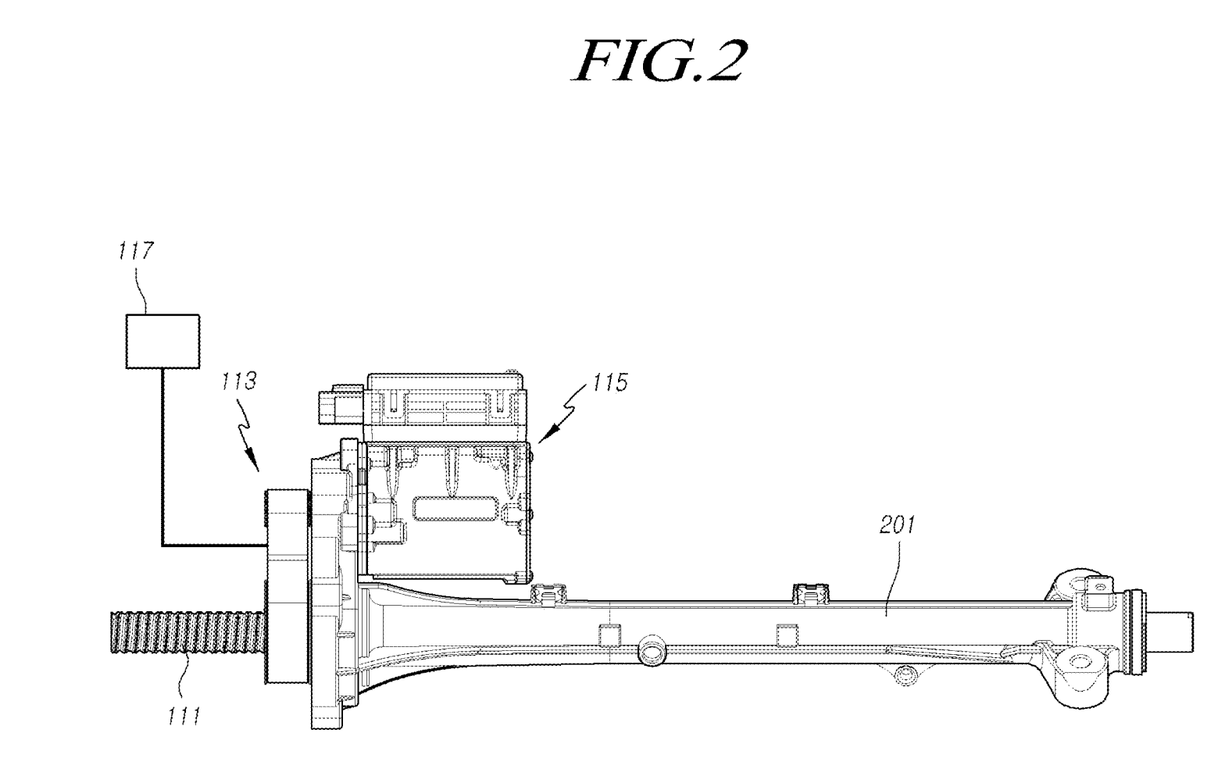
FIG. 2 is a side view of a part of the steer-by-wire steering apparatus according to embodiments of the present disclosure.
Figure 3:
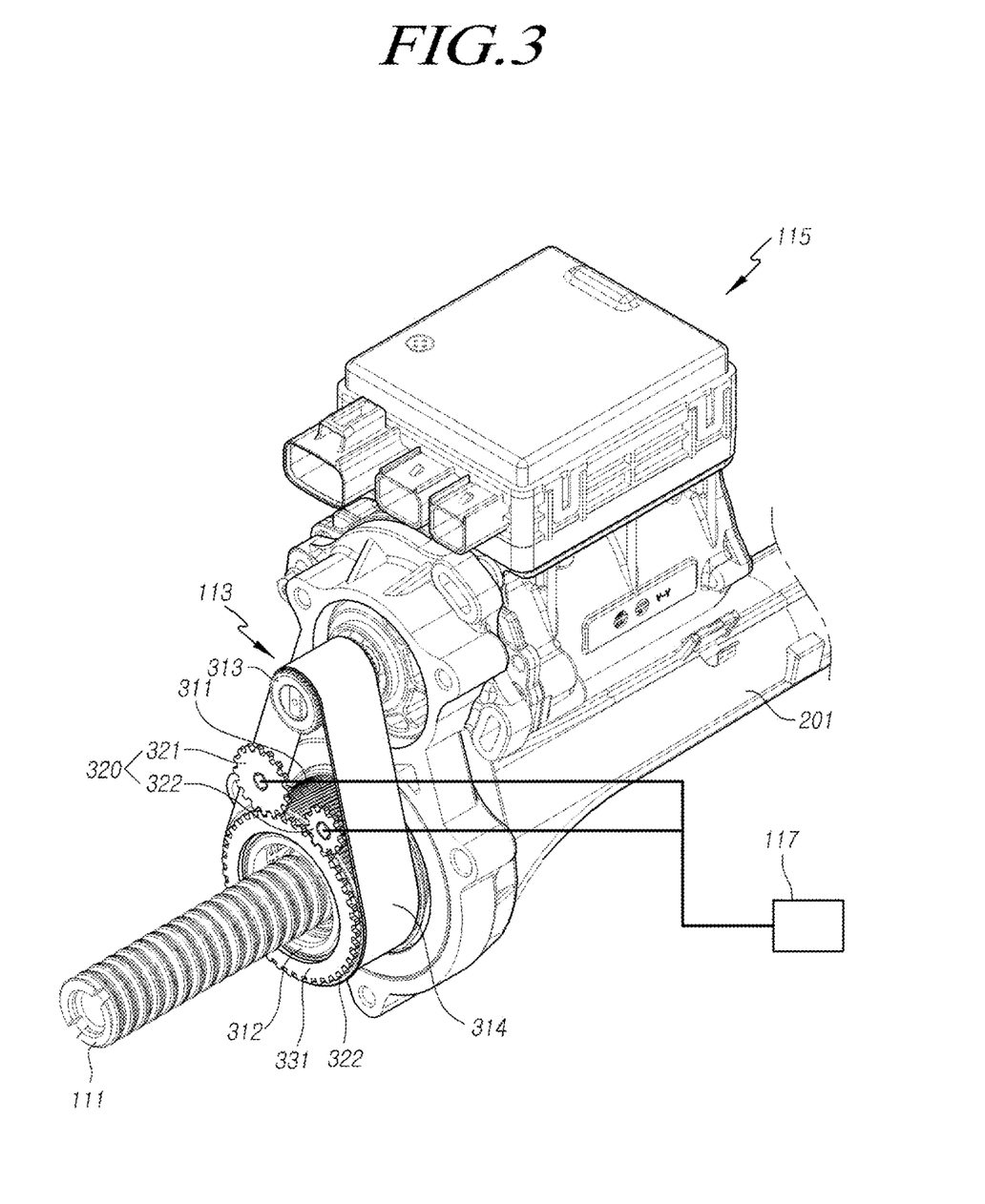
FIGS. 3 and 4 are perspective views of a part of the steer-by-wire steering apparatus according to embodiments of the present disclosure.
Figure 4:
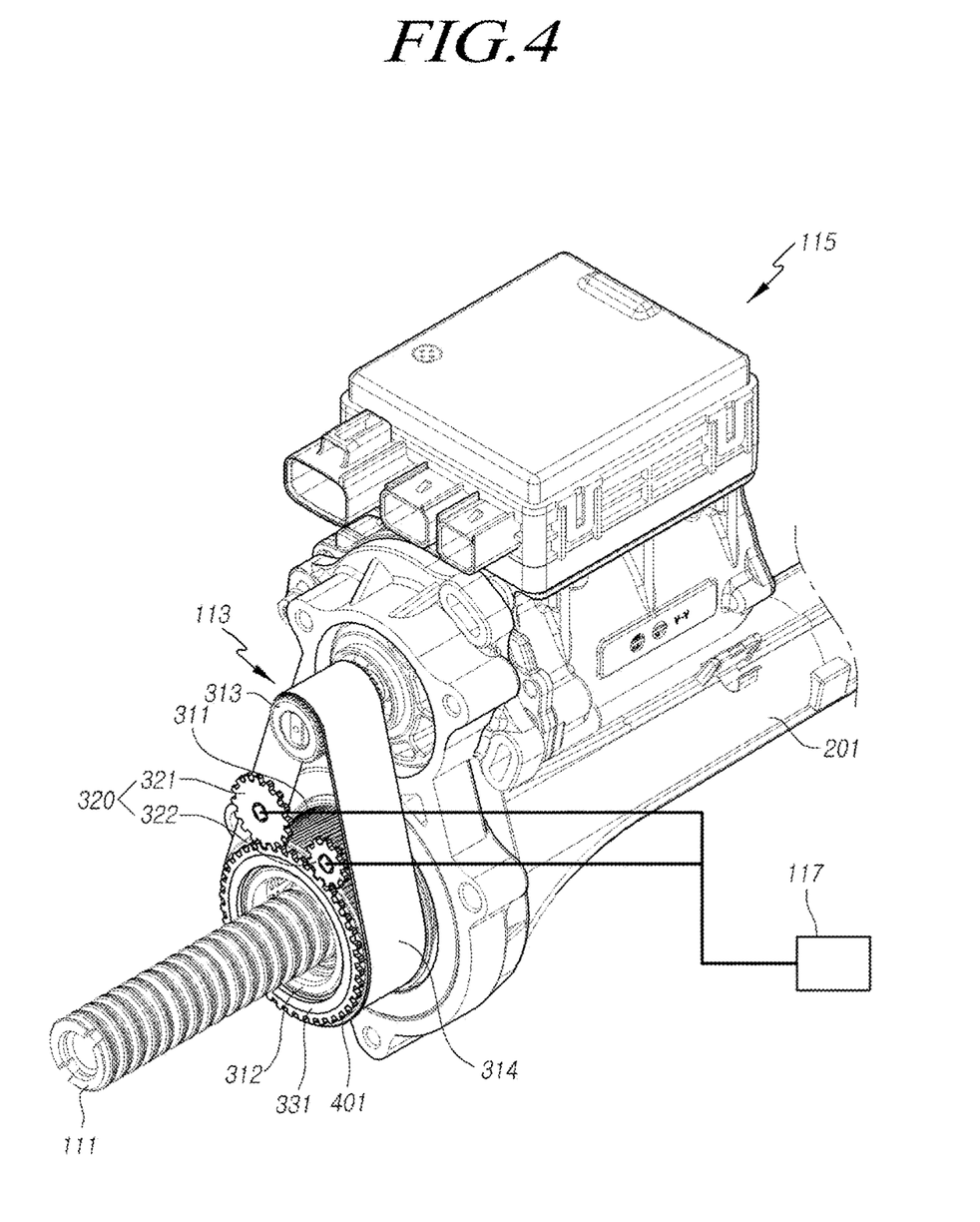
Figure 5:
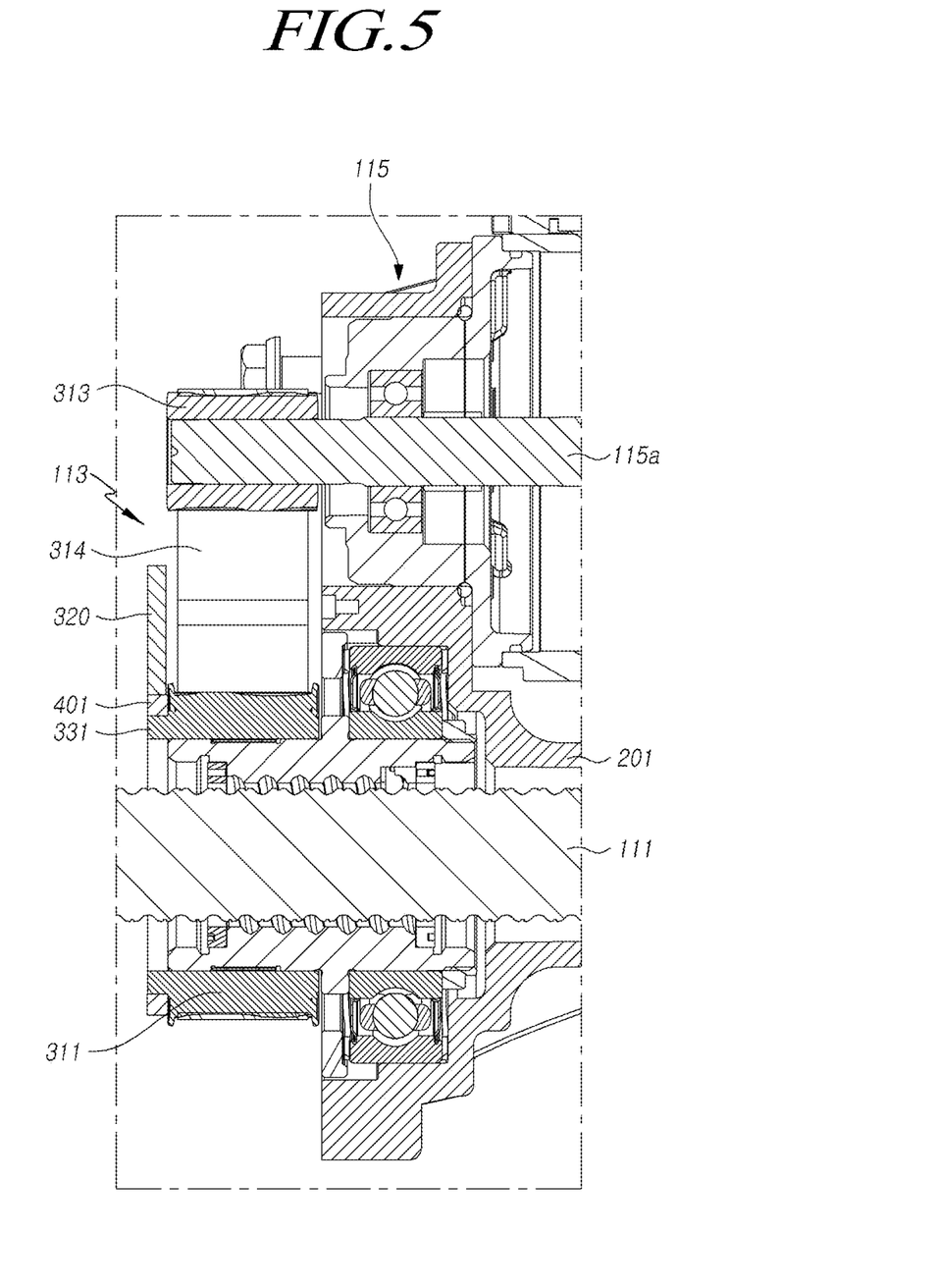
FIG. 5 is a cross-sectional view of FIG. 4.
Figure 6:
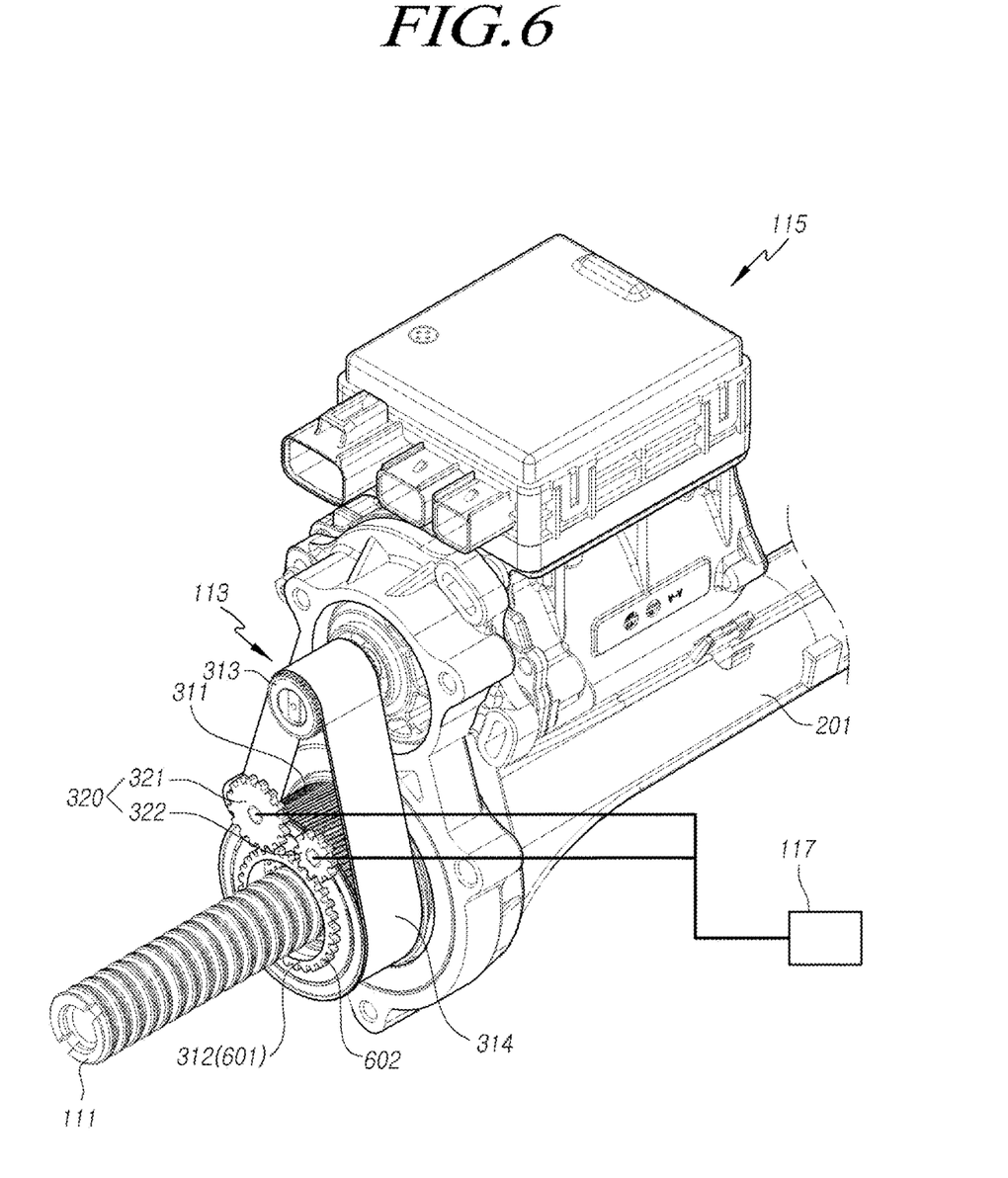
FIGS. 6 and 7 are perspective views of a part of the steer-by-wire steering apparatus according to embodiments of the present disclosure.
Figure 7:
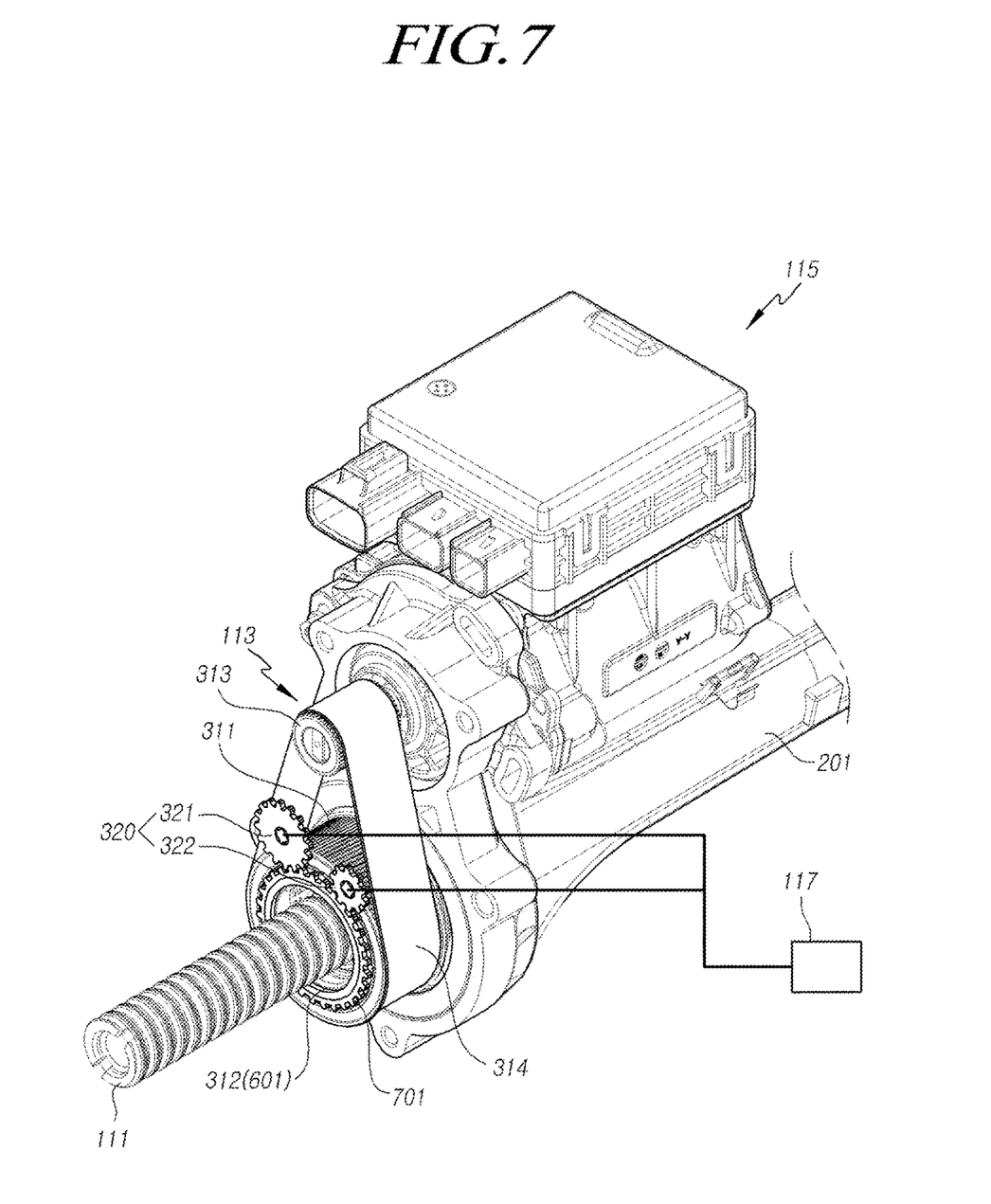
Figure 8:
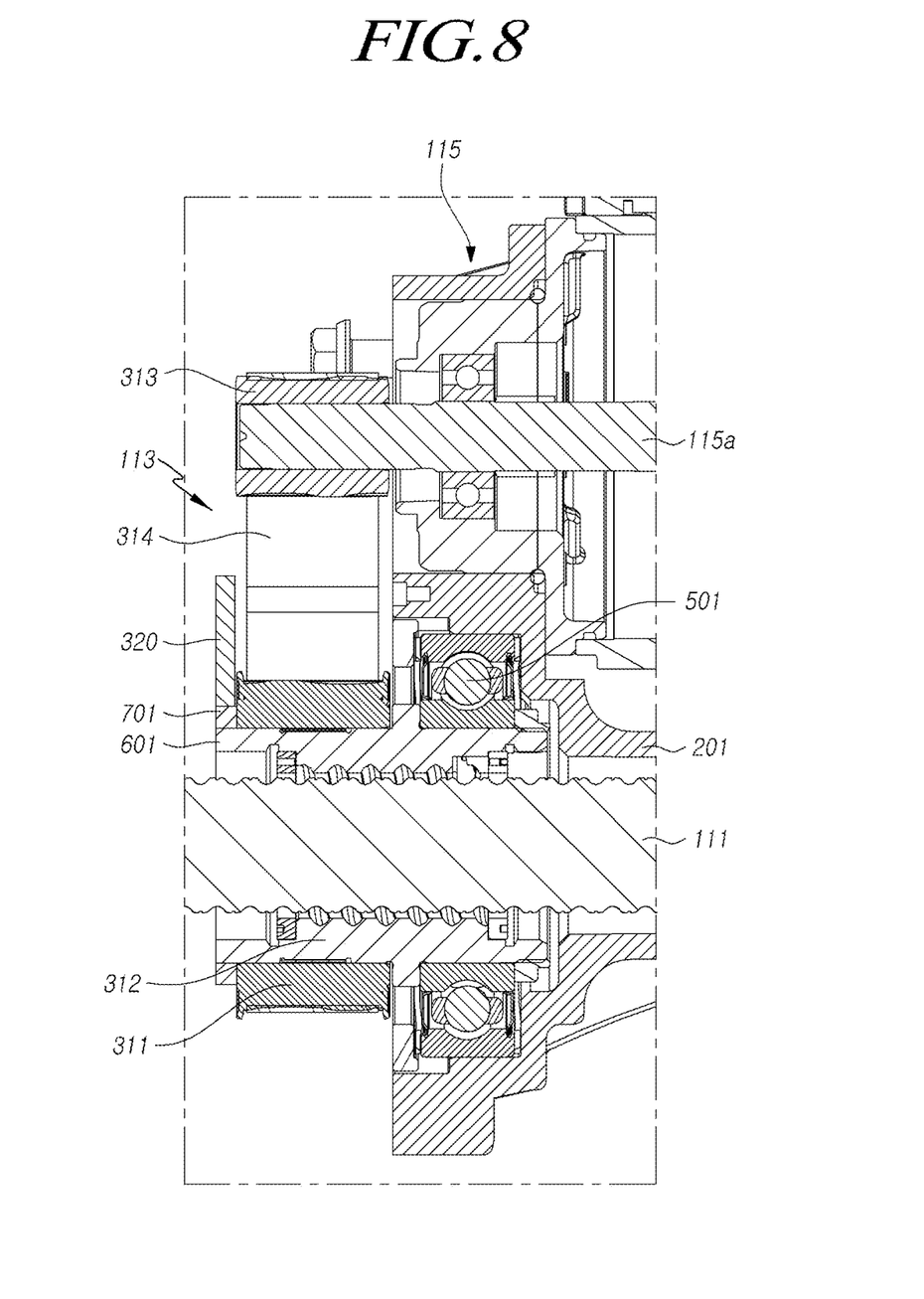
FIG. 8 is a cross-sectional view of FIG. 7.
Figure 9:
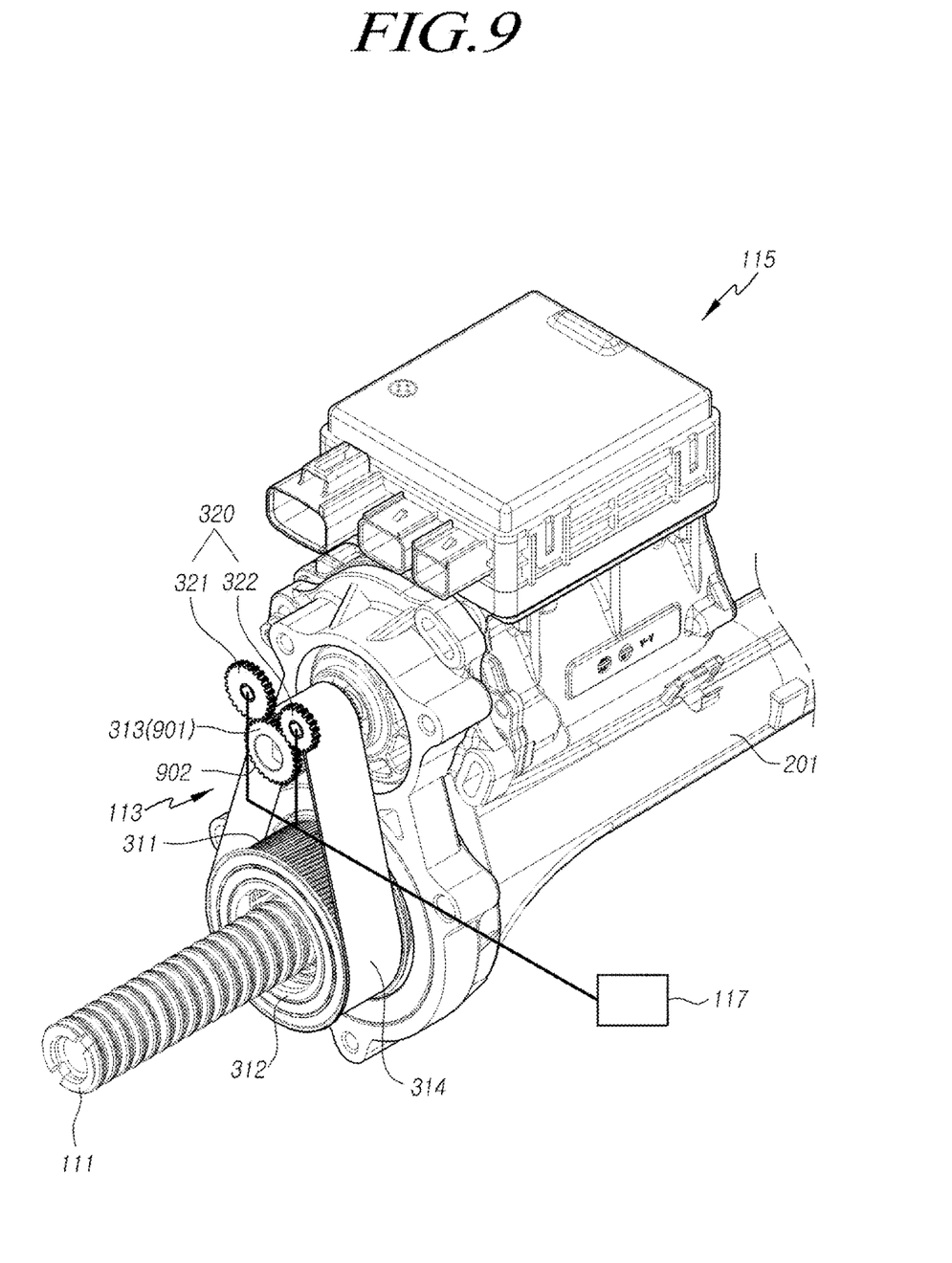
FIGS. 9 and 10 are perspective views of a part of the steer-by-wire steering apparatus according to embodiments of the present disclosure.
Figure 10:
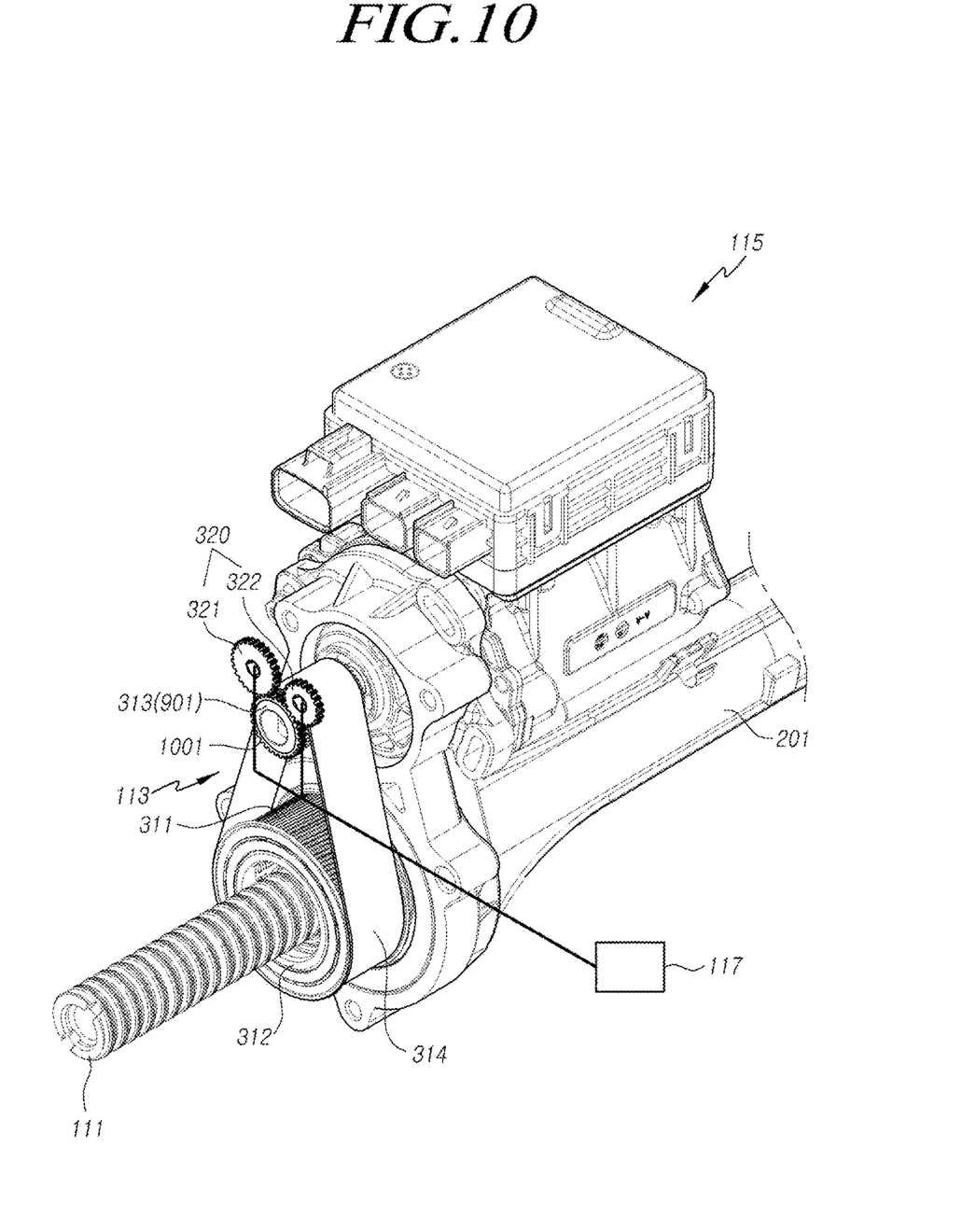
Figure 11:
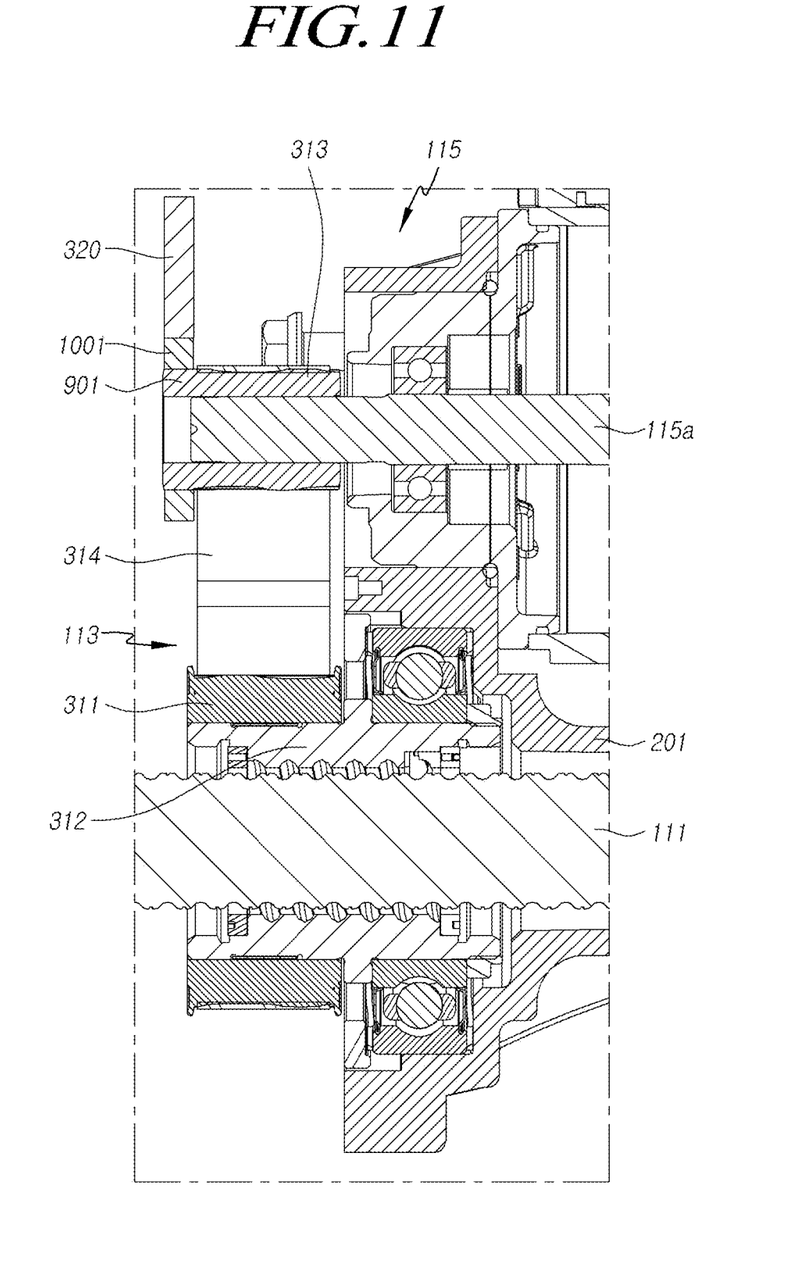
FIG. 11 is a cross-sectional view of FIG. 10.
Figure 12:
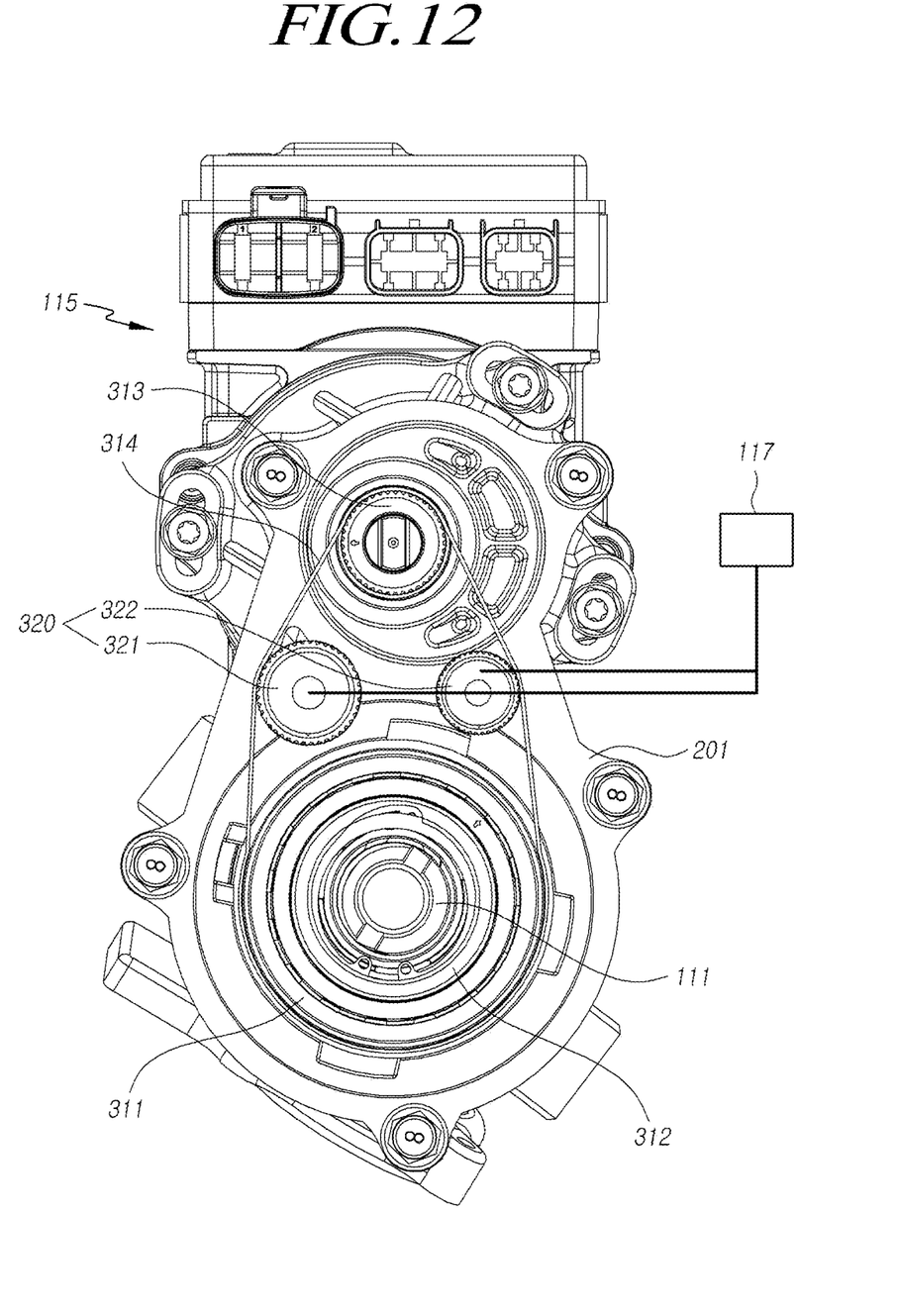
FIG. 12 is a front view of a part of the steer-by-wire steering apparatus according to embodiments of the present disclosure.

FIG. 1 is a schematic view of a steer-by-wire steering apparatus according to embodiments of the present disclosure; FIG. 2 is a side view of a part of the steer-by-wire steering apparatus according to embodiments of the present disclosure; FIGS. 3 and 4 are perspective views of a part of the steer-by-wire steering apparatus according to embodiments of the present disclosure; FIG. 5 is a cross-sectional view of FIG. 4; FIGS. 6 and 7 are perspective views of a part of the steer-by-wire steering apparatus according to embodiments of the present disclosure; FIG. 8 is a cross-sectional view of FIG. 7; FIGS. 9 and 10 are perspective views of a part of the steer-by-wire steering apparatus according to embodiments of the present disclosure; FIG. 11 is a cross-sectional view of FIG. 10; and FIG. 12 is a front view of a part of the steer-by-wire steering apparatus according to embodiments of the present disclosure.

The steer-by-wire steering apparatus according to embodiments of the present disclosure includes a slide bar 111 sliding in an axial direction to steer wheels 125, a motor 115 connected to the slide bar 111 through a gear box 113 to slide the slide bar 111, and a sensor 117 detecting rotation information from the gear box 113 and detecting a movement position of the slide bar 111 based on the rotation information.

First, referring to FIG. 1, the steer-by-wire steering apparatus according to embodiments of the present disclosure includes an angle sensor 107, a torque sensor 105, and the like provided on a steering shaft 103 connected to a steering wheel 101. The angle sensor 107, the torque sensor 105, and the like detect a driver's operation of the steering wheel 101 and transmit electrical signals regarding the driver's operation to an electronic control unit 110. The electronic control unit 110 drives a steering shaft motor 109 coupled to the steering shaft 103 and the motor 115 connected to the slide bar 111 based on the received electrical signals.

The electronic control unit 110 controls the steering shaft motor 109 and the motor 115 based on electrical signals received from not only the angle sensor 107 and the torque sensor 105 but also a plurality of other sensors provided on the vehicle. For example, the electronic control unit 110 may receive steering information from a motor position sensor, as well as various other sensors, such as radars, light detection and ranging (LiDAR) sensors, and camera image sensors.

When the driver operates the steering wheel 101, the steering shaft motor 109 may provide the steering shaft 103 with reaction force torque directed opposite to the steering torque of the driver, thereby improving the feeling of steering of the driver. In autonomous driving, the steering shaft motor 109 may rotate the steering shaft 103 to steer the vehicle.

The rotational force of the motor 115 is converted by the gear box 113 to axially side the slide bar 111. A tie rod 121 and a knuckle arm 123 are coupled to the slide bar 111. As the slide bar 111 is slid within a housing 201, the wheels 125 are steered.

Such a steer-by-wire steering apparatus does not have a mechanical connection between the steering wheel 101 and the wheels 125. Thus, the sensor 117 detecting the movement position of the slide bar 111 is provided in order to determine whether or not the slide bar 111 has slid by a distance corresponding to the driver's operation on the steering wheel 101.

The sensor 117 is provided to detect the rotation information from the gear box 113 connecting the motor 115 and the slide bar 111 and detect the movement position of the slide bar 111 based on the detected rotation information. Thus, even in the case that a pinion shaft or the like is not provided, the movement position of the slide bar 111 may be detected. Accordingly, the number of parts may be reduced and an assembly process may be simplified, thereby significantly reducing costs.

In other words, a steer-by-wire steering apparatus of the related art is provided with a pinion shaft in order to detect the movement position of the rack bar even in the case that there is no mechanical connection between the steering wheel and the wheels. This is because of high compatibility with a production line and an assembly line in which parts of a conventional steering apparatus rather than a steer-by-wire steering apparatus are manufactured and assembled.

However, in order to detect the movement position of the rack bar using the pinion shaft, a rack gear should be machined on the rack bar, and not only the pinion shaft but also a support yoke by which a pinion gear is engaged with the rack gear is necessary. Thus, there have been problems in that a large number of parts are necessary and the assembly process thereof is complicated.

That is, referring to FIG. 2, in the steer-by-wire steering apparatus of the related art, the pinion shaft, the support yoke, and the like are provided on the right portion of a rack housing in the figure. However, the steer-by-wire steering apparatus according to embodiments of the present disclosure detects the position of the slide bar 111 by detecting the rotation information from the gear box 113 using the sensor 117. The pinion shaft, the support yoke, and the like are removed, and an assembly space for the pinion shaft, the support yoke, and the like is not provided in the housing 201. Consequently, it is possible to simplify the shape of the housing 201, thereby simplifying the assembly process and significantly reducing costs.

The sensor 117 may transmit the detected position of the slide bar 111 to the electronic control unit 110 (see FIG. 1), and the electronic control unit 110 may determine whether or not the wheels 125 are accurately steered based on the movement position of the slide bar 111.

Hereinafter, a method of determining the movement position of the slide bar 111 and specific structures of the gear box 113 and the sensor 117 will be described with reference to FIGS. 3 to 12.

The slide bar 111 may have a screw provided on the outer circumferential portion thereof. The gear box 113 may include a ball nut 312 coupled to the screw, a nut pulley 311 coupled to the ball nut 312, a motor pulley 313 coupled to a motor shaft 115a of the motor 115, and a belt 314 connecting the nut pulley 311 and the motor pulley 313.

A configuration in which the rotational force of the motor 115 is converted by the ball nut 312, the nut pulley 311, the motor pulley 313, and the belt 314 to axially slide the slide bar 111 is well known, and thus a detailed description thereof will be omitted.

Here, the sensor 117 detects the movement position of the slide bar 111 by detecting the rotation information from at least one of the nut pulley 311, the ball nut 312, the motor pulley 313, and the belt 314.

That is, each of the nut pulley 311, the ball nut 312, the motor pulley 313, and the belt 314 rotates at a predetermined reduction ratio with respect to the movement distance by which the slide bar 111 axially slides. Thus, as the sensor 117 detects the rotation information from at least one of the nut pulley 311, the ball nut 312, the motor pulley 313, and the belt 314, the sensor 117 may detect the position of the slide bar 111 based on the reduction ratio of each of the nut pulley 311, the ball nut 312, the motor pulley 313, and the belt 314.

The sensor 117 includes a gear member 320 to be described in detail later. As the gear member 320 rotates in engagement with one of the nut pulley 311, the ball nut 312, the motor pulley 313, and the belt 314, the sensor 117 detects the rotation information of the one of the nut pulley 311, the ball nut 312, the motor pulley 313, and the belt 314 from the rotation of the gear member 320.

The sensor 117 may detect an absolute angle or a phase angle of the gear member 320. In a situation in which the sensor 117 detects the absolute angle of the gear member 320, the movement position of the slide bar 111 may be detected even in the case that the gear member 320 is provided as a single gear. However, in a situation in which the sensor 117 detects the phase angle of the gear member 320, the gear member 320 may include a first gear member 321 and a second gear member 322 in order to detect the movement position of the slide bar 111.

That is, the gear member 320 may include the first gear member 321 and the second gear member 322 having different diameters. The rotation information that the sensor 117 detects from the gear member 320 may include first rotation information that is rotation information of the first gear member 321 and second rotation information that is rotation information of the second gear member 322.

Since the first gear member 321 and the second gear member 322 have different diameters and each rotates in engagement with one of the nut pulley 311, the ball nut 312, the motor pulley 313, and the belt 314, there is a phase difference between the first rotation information and the second rotation information, and the sensor 117 may determine the movement position of the slide bar 111 based on this phase difference.

For example, the sensor 117 may determine the movement position of the slide bar 111 based on the phase difference between the first rotation information and the second rotation information and the number of times the phase difference is zero (0).

$$R = \frac{K}{360} \times \theta + K \times n \quad \text{[Equation 1]}$$

R indicates the movement position of the slide bar 111, θ indicates the phase difference between the first rotation information and the second rotation information, K indicates a distance by which the slide bar 111 slides and moves in one direction while the phase difference between the first rotation information and the second rotation information changes from 0 and becomes 0 again, and n indicates the number of times the phase difference between the first rotation information and the second rotation information is 0.

That is, as the slide bar 111 slides, the phase difference between the first rotation information and the second rotation information increases or decreases. A distance by which the slide bar 111 slides until the phase difference between the first rotation information and the second rotation information, which has become 0, becomes 0 again may be calculated in advance, and the movement position of the slide bar 111 may be determined based on the calculated distance.

As described above, the steer-by-wire steering apparatus according to embodiments of the present disclosure can detect the movement position of the slide bar 111 even without being provided with the pinion shaft or the like. Accordingly, the number of parts can be reduced and the assembly process can be simplified, thereby significantly reducing costs.

Meanwhile, as described above, the gear member 320 of the sensor 117 rotates in engagement with one of the nut pulley 311, the ball nut 312, the motor pulley 313, and the belt 314. First, a situation in which the gear member 320 rotates in engagement with the nut pulley 311 will be described.

Although an embodiment in which the gear member 320 including the first gear member 321 and the second gear member 322 is engaged with the nut pulley 311 or the like is illustrated in the figures, the gear member 320 is not limited thereto. As described above, the gear member 320 may be provided as a single gear member.

In addition, the gear member 320 may be configured as a spur gear as illustrated in the figures, but the gear member 320 is not limited thereto. Rather, the gear member 320 may be a helical gear, a bevel gear, or the like. First gear teeth 332, a third gear member 401, or the like to be described later may also be different depending on the shape of the gear member 320.

In addition, the gear member 320 may have a greater diameter than illustrated in the figures, in consideration of the durability, strength, gear ratio, and the like of the gear. In such a case, the gear members may be disposed such that portions thereof overlap in the axial direction.

Referring to FIGS. 3 to 5, the nut pulley 311 includes a first extension 311 axially extending from a portion of the nut pulley 311 on which the belt 314 is wound.

In addition, the first gear teeth 332 engaging with the gear member 320 may be provided on the outer circumferential portion of the first extension 311, or the third gear member 401 engaging with the gear member 320 may be coupled to the first extension 311.

In a situation in which the gear member 320 includes the first gear member 321 and the second gear member 322, each of the first gear member 321 and the second gear member 322 engages with the first gear teeth 332 or the third gear member 401. For the axial movement distance of the slide bar 111, the first gear member 321 and the second gear member 322 rotate at different reduction ratios according to respective gear ratios.

That is, the nut pulley 311 includes the first extension 311 extending from one axial side of the nut pulley 311, in addition to the portion on which the belt 314 is wound, in order to rotate in concert with the belt 314. The first extension 311 has the shape of a loop, into which the slide bar 111 is inserted. The first extension 311 is provided with the first gear teeth 332 engaging with the gear member 320, or the third gear member 401 is coupled to the first extension 311. Thus, the sensor 117 may detect the rotation information from the nut pulley 311, based on the rotation of the gear member 320.

That is, the length of the first extension 311 protruding in the axial direction and the radial thickness of the first extension 311 may differ depending on whether the first extension 311 is provided with the first gear teeth 332 or the third gear member 401 is coupled to the first extension 311.

The third gear member 401 is configured in a loop shape capable of being coupled to the outer circumferential portion of the first extension 311, and has gear teeth on the outer circumferential portion thereof to engage with the gear member 320.

That is, the inner circumferential portion of the third gear member 401 and the outer circumferential portion of the first extension 311 are supported on each other. Although not shown in the drawings, serrations engaging with each other may be provided on the inner circumferential portion of the third gear member 401 and the outer circumferential portion of the first extension 311, respectively, such that the third gear member 401 may be supported in the circumferential direction during rotation of the nut pulley 311.

Next, referring to FIGS. 6 to 8, the ball nut 312 includes a second extension 601 axially extending to protrude from the inside to the outside of the nut pulley 311.

In addition, second gear teeth 602 engaging with the gear member 320 may be provided on the outer circumferential portion of the second extension 601, or a fourth gear member 701 engaging with the gear member 320 may be coupled to the second extension 601.

In a situation in which the gear member 320 includes the first gear member 321 and the second gear member 322, each of the first gear member 321 and the second gear member 322 engages with the second gear teeth 602 or the fourth gear member 701. For # the axial movement distance of the slide bar 111, the first gear member 321 and the second gear member 322 rotate at different reduction ratios according to respective gear ratios.

That is, a bearing 501 or the like is coupled to the outer circumferential portion of the ball nut 312 so as to be supported on the nut pulley 311 and the housing 201. The second extension 601 is provided such that the ball nut 312 protrudes outward from the inside of the nut pulley 311 while axially extending. The second gear teeth 602 is provided on or the fourth gear member 701 is coupled to the outer circumferential portion of the outwardly exposed second extension 601. Thus, the sensor 117 may detect the rotation information from the ball nut 312, based on the rotation of the gear member 320.

The distance of the second extension 601 protruding in the axial direction and the radial thickness of the second extension 601 may differ depending on whether the second gear teeth 602 is provided on or the fourth gear member 701 is coupled to the second extension 601.

Like the third gear member 401, the fourth gear member 701 is configured in a loop shape and has great teeth on the outer circumferential portion to engage with the gear member 320.

That is, the inner circumferential portion of the fourth gear member 701 and the outer circumferential portion of the second extension 601 are supported on each other. Although not shown in the figures, serrations engaging with each other may be provided on the inner circumferential portion of the fourth gear member 701 and the outer circumferential portion of the second extension 601, respectively.

Next, referring to FIGS. 9 to 11, the motor pulley 313 includes a third extension 901 axially extending from a portion on which the belt 314 is wound.

In addition, third gear teeth 902 engaging with the gear member 320 may be provided on the outer circumferential portion of the third extension 901, and a fifth gear member 1001 engaging with the gear member 320 may be coupled to the third extension 901.

In a situation in which the gear member 320 includes the first gear member 321 and the second gear member 322, each of the first gear member 321 and the second gear member 322 engages with the third gear teeth 902 or the fifth gear member 1001. For the axial movement distance of the slide bar 111, the first gear member 321 and the second gear member 322 rotate at different reduction ratios according to respective gear ratios.

That is, the motor pulley 313 includes the third extension 901 extending from one axial side of the motor pulley 313, in addition to the portion on which the belt 314 is wound, in order to rotate in concert with the belt 314. The third extension 901 has a cylindrical shape. The third gear teeth 902 engaging with the gear member 320 is provided on the third extension 901, or the fifth gear member 1001 is coupled to the third extension 901. Thus, the sensor 117 may detect the rotation information from the nut pulley 311, based on the rotation of the gear member 320.

The length of the third extension 901 protruding in the axial direction and the radial thickness of the third extension 901 may differ depending on whether the third gear teeth 902 is provided on the third extension 901 or the fifth gear member 1001 is coupled to the third extension 901.

The fifth gear member 1001 is configured in a loop shape capable of being coupled to the outer circumferential portion of the third extension 901, and has gear teeth on the outer circumferential portion thereto to engage with the gear member 320.

That is, the inner circumferential portion of the fifth gear member 1001 and the outer circumferential portion of the third extension 901 are supported on each other. Although not shown in the figures, serrations engaging with each other may be provided on the inner circumferential portion of the fifth gear member 1001 and the outer circumferential portion of the third extension 901, respectively.

Next, referring to FIG. 12, the gear member 320 may engage with the belt 314 while being supported on the inner surface of the belt 314.

The gear teeth engaging with the nut pulley 311 and the motor pulley 313 are provided on the inner portion of the belt 314. Thus, as the gear member 320 rotates in concert with the belt 314 while being supported on the inner surface of the belt 314, the sensor 117 may detect the rotation information from the belt 314, based on the rotation of the gear member 320.

That is, the gear member 320 is positioned between the motor pulley 313 and the nut pulley 311 and supported on the inner surface of the belt 314. In a situation in which the gear member 320 includes the first gear member 321 and the second gear member 322, the first gear member 321 and the second gear member 322 each engage with the belt 314 so as to rotate at different reduction ratios for the axial movement distance of the slide bar 111.

As set forth above, the first gear teeth 332 or the like is provided on the nut pulley 311, the ball nut 312, the motor pulley 313, and the belt 314, or the third gear member 401 or the like is coupled to the nut pulley 311, the ball nut 312, the motor pulley 313, and the belt 314 so as to engage with the gear member 320. Thus, the sensor 117 may detect the movement position of the slide bar 111 by detecting the rotation information from one of the nut pulley 311 or the like.

According to the steer-by-wire steering apparatus having the above-described configuration, the pinion gear or the like is removed. The steer-by-wire steering apparatus can detect the position of the slide bar based on rotation information detected from the gear box transferring rotational force from the motor to the slide bar so as to reduce the number of parts and simplifying the assembly process, thereby significantly reducing costs.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This application is the national stage of International Patent Application No. PCT/KR2020/007518 filed on Jun. 10, 2020, which claims under 35 U.S.C. § 119(a) the benefit of priority to Korean Patent Application No. 10-2019-0073264, filed on Jun. 20, 2019, which is hereby incorporated by reference for all purposes as if fully set forth herein. In addition, when this application claims priority in 20 countries other than the U.S.A. on the same basis, the entire content of which is hereby incorporated by reference.

The invention claimed is:

1. A steer-by-wire steering apparatus comprising:
a slide bar;
a motor connected to the slide bar by a gear box to slide the slide bar; and
a sensor detecting rotation information from the gear box and detecting a moveme position of the slide bar based on the rotation information.

2. The steer-by-wire steering apparatus of claim 1, wherein the gear box comprises a ball nut coupled to the slide bar, a nut pulley coupled to the ball nut, a motor pulley coupled to a motor shaft of the motor, and a belt connecting the nut pulley and the motor pulley, and
the sensor detects the rotation information from at least one of the nut pulley, the ball nut, the motor pulley, and the belt.

3. A steer-by-wire steering apparatus comprising:
a slide bar;
a motor connected to the slide bar by a gear box to slide the slide bar; and
a sensor detecting rotation information from the gear box and detecting a movement position of the slide bar based on the rotation information,
wherein:
the gear box comprises a ball nut coupled to the slide bar, a nut pulley coupled to the ball nut, a motor pulley coupled to a motor shaft of the motor, and a belt connecting the nut pulley and the motor pulley,
the sensor comprises a gear member rotating in engagement with one of the nut pulley, the ball nut, the motor pulley, and the belt, and
the sensor detects the rotation information from the gear member.

4. The steer-by-wire steering apparatus of claim 3, wherein the gear member comprises a first gear member and a second gear member having different diameters, and
the rotation information comprises first rotation information that is rotation information of the first gear member and second rotation information that is rotation information of the second gear member.

5. The steer-by-wire steering apparatus of claim 4, wherein the sensor determines the movement position of the slide bar based on a phase difference between the first rotation information and the second rotation information and the number of times the phase difference is 0.

6. The steer-by-wire steering apparatus of claim 4, wherein the nut pulley comprises a first extension axially extending from a portion of the nut pulley on which the belt is wound.

7. The steer-by-wire steering apparatus of claim 6, wherein the first extension comprises first gear teeth on an outer circumferential portion to engage with the first gear member and the second gear member.

8. The steer-by-wire steering apparatus of claim 6, wherein a third gear member engaging with the first gear member and the second gear member is coupled to the first extension.

9. The steer-by-wire steering apparatus of claim 4, wherein the ball nut comprises a second extension axially extending to protrude from the inside to the outside of the nut pulley.

10. The steer-by-wire steering apparatus of claim 9, wherein the second extension comprises second gear teeth on an outer circumferential portion to engage with the first gear member and the second gear member.

11. The steer-by-wire steering apparatus of claim 9, wherein a fourth gear member engaging with the first gear member and the second gear member is coupled to the second extension.

12. The steer-by-wire steering apparatus of claim 4, wherein the motor pulley comprises a third extension axially extending from a portion of the motor pulley on which the belt is wound.

13. The steer-by-wire steering apparatus of claim 12, wherein third gear teeth engaging with the first gear member and the second gear member is provided on an outer circumferential portion of the third extension.

14. The steer-by-wire steering apparatus of claim 12, wherein a fifth gear member engaging with the first gear member and the second gear member is coupled to the third extension.

15. The steer-by-wire steering apparatus of claim 4, wherein the first gear member and the second gear member rotate in engagement with the belt.

* * * * *